United States Patent
Satori et al.

(10) Patent No.: US 7,159,856 B2
(45) Date of Patent: Jan. 9, 2007

(54) FLUID SEALED ANTIVIBRATION DEVICE

(75) Inventors: Kazutoshi Satori, Saitama (JP); Jun Saitoh, Saitama (JP); Yukimitsu Minamibata, Saitima (JP)

(73) Assignees: Honda Motor Co., Ltd., Tokyo (JP); Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 10/476,538

(22) PCT Filed: Jun. 7, 2002

(86) PCT No.: PCT/JP02/05667

§ 371 (c)(1),
(2), (4) Date: Nov. 3, 2003

(87) PCT Pub. No.: WO03/001080

PCT Pub. Date: Jan. 3, 2003

(65) Prior Publication Data

US 2004/0145125 A1    Jul. 29, 2004

(30) Foreign Application Priority Data

Jun. 22, 2001 (JP) .............................. 2001-190527
Jun. 23, 2001 (JP) .............................. 2001-228706

(51) Int. Cl.
*F16F 5/00* (2006.01)
(52) U.S. Cl. ................................ 267/140.13; 267/141.4
(58) Field of Classification Search ..............................
267/140.11–140.13, 140.2–140.4, 141, 141.3–141.7
See application file for complete search history.

(56) References Cited

U.S. PATENT DOCUMENTS

| | | | | |
|---|---|---|---|---|
| 4,711,206 A | * | 12/1987 | Andra et al. | ........... 267/140.13 |
| 4,834,350 A | | 5/1989 | de fontenay | |
| 5,167,403 A | * | 12/1992 | Muramatsu et al. | ... 267/140.13 |
| 5,462,261 A | | 10/1995 | Ecket et al. | |
| 5,667,205 A | * | 9/1997 | Mutoh et al. | .......... 267/140.13 |
| 5,718,417 A | * | 2/1998 | Aoki | .................... 267/140.14 |
| 6,131,894 A | * | 10/2000 | Satori et al. | ........... 267/140.13 |
| 6,244,578 B1 | | 6/2001 | Schwerdt | |
| 6,250,615 B1 | * | 6/2001 | Leibach | ................. 267/140.13 |
| 6,250,616 B1 | * | 6/2001 | Suzuki et al. | ......... 267/140.13 |
| 2003/0024593 A1 | * | 2/2003 | Anzawa et al. | ............... 140/14 |

FOREIGN PATENT DOCUMENTS

| | | |
|---|---|---|
| EP | 0 821 181 A2 | 1/1998 |
| EP | 0 939 243 A2 | 9/1999 |
| JP | 57-130825 A | 8/1982 |
| JP | 58-124841 A | 7/1983 |
| JP | 59-158731 U | 10/1984 |

(Continued)

*Primary Examiner*—Xuan Lan Nguyen
(74) *Attorney, Agent, or Firm*—Birch, Stewart, Kolasch & Birch, LLP (57) ABSTRACT

A partition member for dividing a fluid chamber into a main fluid chamber and a sub-fluid chamber is provided with an idle orifice passage of which the opening is opened and closed by a seating section provided on part of a diaphragm. A pushing member is provided to control the opening and closing operation. The seating member is formed thick of which the upper and lower surfaces are provided with depressions respectively. The seating member is also provided with a thin section of which the periphery is provided with a hemispheric protrusion and a seal of a substantially right triangle cross section. An elastic body section is also provided at the side surface with a lateral membrane section.

4 Claims, 8 Drawing Sheets

FOREIGN PATENT DOCUMENTS

| | | |
|---|---|---|
| JP | 7-305740 A | 11/1995 |
| JP | 8-277879 A | 10/1996 |
| JP | 9-210118 A | 8/1997 |
| JP | 10-89402 A | 4/1998 |
| JP | 10-281214 A | 10/1998 |
| JP | 11-51109 A | 2/1999 |
| JP | 11-166578 A | 6/1999 |
| JP | 2000-257665 A | 9/2000 |
| JP | 2001-99223 A | 4/2001 |

* cited by examiner

FLUID SEALED ANTIVIBRATION DEVICE

This application is the national phase under 35 U.S.C. § 371 of PCT International Application No. PCT/JP02/05667 which has an International filing date of Jun. 7, 2002, which designated the United States of America.

BACKGROUND OF THE INVENTION

1. Field of the Invention

The present invention relates to a fluid sealed antivibration device for use in an automobile engine mount or the like.

2. Description of the Prior Art

Such a fluid sealed engine mount is known and disclosed for example in Japanese Unexamined Patent Publication No. HEI 10-281214 (1998) in which an idle orifice passage is provided between a main fluid chamber and a sub-fluid chamber, and part of a diaphragm forming the sub-fluid chamber serves as a seating section which is adapted to open and close the idle orifice passage. In the normal condition, a pushing member is pushed to cause the seating section to close an opening of the idle orifice passage. In the idling condition, the pushing member is caused to open the seating section, wherein the seating section opens the opening of the idle orifice passage to open the idle orifice passage.

However, in the case where an opening and closing means for the orifice passage is provided, this opening and closing means may generate an abnormal sound. For example, in the case of the idle orifice passage, when large vibration at the time of starting or stopping an engine is input in the closing condition, an elastic body section elastically deforms to make the inside of the main fluid chamber positive pressure or negative pressure. As a result, sudden change of internal pressure is caused to generate a cavitation phenomenon whereby many bubbles of air are generated in the fluid. Once this phenomenon generates, the opening and closing means for closing the orifice passage may be pushed back toward the sub-fluid chamber side or on the contrary, the opening and closing means is strongly attracted to the main fluid chamber side. Thus, the abnormal sound is generated by repeating the above.

SUMMARY OF THE INVENTION

It is therefore an object of the present invention to control the generation of an abnormal sound by an opening and closing means based on the change of internal pressure in a main fluid chamber at the time of starting or stopping an engine.

To solve the above-mentioned problems, a fluid sealed antivibration device according to claim 1 comprises a first connecting member secured to a vibration source side, a second connecting member secured to a car body side, and an elastic body section of a substantially conical shape disposed therebetween, wherein a fluid chamber is formed using the elastic body section as part of its wall and divided into a main fluid chamber and a sub-fluid chamber by a partition member which is provided with an orifice passage for communicating with both the main fluid chamber and the sub-fluid chamber, and there is provided an opening and closing means for opening and closing the orifice passage, characterized in that the opening and closing means is provided to have a seating section made of at least an elastic member which contacts an opening of the orifice passage, and that the seating section is formed thicker than the remaining sections and provided at the central section with a thin section for absorbing the change of internal pressure in the main fluid chamber.

According to claim 2, the fluid sealed antivibration device according to claim 1 is provided, in which a circular seal is provided on the periphery enclosing the thin section of the seating section and it has a substantially right triangle cross section in which an oblique side is provided inside the seating section and a substantially vertical side is provided outside the seating section.

According to claim 3, the fluid sealed antivibration device according to claim 2 is provided, in which a plurality of substantially hemispheric projections of which the projecting height is lower than the seal are provided in the circumferential direction inside the seal.

According to claim 4, the fluid sealed antivibration device according to any one of claims 1 through 3 is provided, in which the seating section is provided on part of a diaphragm forming the sub-fluid chamber.

According to claim 5, the fluid sealed antivibration device according to claim 4 is provided, in which the orifice passage is closed by pushing the seating section by a pushing member and there is also provided a depression on the side of the seating section contacting the pushing member.

According to claim 6, the fluid sealed antivibration device according to claim 5 is provided, in which there is provided a depression on the surface of the pushing member contacting the seating section.

According to claim 7, the fluid sealed antivibration device according to any one of claims 1 through 6 is provided, in which the elastic body section is detachably provided with a thin, elastically deformable lateral membrane section which is adapted to absorb the change of internal pressure in the main fluid chamber.

A fluid sealed antivibration device according to claim 8 comprises a first connecting member secured to a vibration source side, a second connecting member secured to a car body side, and an elastic body section of a substantially conical shape provided therebetween, wherein a fluid chamber is provided using the elastic body section as part of its wall and divided into a main fluid chamber and a sub-fluid chamber by a partition member which is provided with an orifice passage for communicating with both the main fluid chamber and the sub-fluid chamber, and there is provided an opening and closing means for opening and closing the orifice passage, characterized in that the outer peripheral section of the partition member is supported in a floating manner through an elastic body section.

A fluid sealed antivibration device according to claim 9 comprises a first connecting member secured to a vibration source side, a second connecting member secured to a car body side, and an elastic body section of a substantially conical shape provided therebetween, wherein a fluid chamber is provided using the elastic body section as part of its wall and divided into a main fluid chamber and a sub-fluid chamber by a partition member which is provided with an orifice passage for communicating with both the main fluid chamber and the sub-fluid chamber, and there is provided an opening and closing means for opening and closing the orifice passage, characterized in that the opening and closing means for the orifice passage comprises a seating section provided on a diaphragm forming the sub-fluid chamber and a pushing member for pushing the seating section by a return spring, and that the pushing member is composed of an elastic material which is integrally formed with a rigid plate and one end of the return spring is supported in a floating manner.

According to claim 1, since the seating section is formed thick and provided at its central section with a thin section, this thin section absorbs the change of internal pressure in the main fluid chamber. Accordingly, even though large vibration is input, sudden change of internal pressure in the main fluid chamber can be controlled to prevent the generation of a cavitation phenomenon, thereby making the generation of an abnormal sound by the seating section difficult.

According to claim 2, since the seal is designed to have a substantially right triangle cross section of which the outside has a substantially vertical side, when the seating section contacts the partition member side, the apex of the seal which first contacts the partition member tilts toward the vertical side. Accordingly, it is possible not only to enhance the sealing effect, but also to relieve an impact of contact, thereby controlling the generation of an abnormal sound.

According to claim 3, since there is provided a substantially hemispheric projection of which the projecting height is lower than that of the seal, the contacting condition can be changed so that the seal first contacts the partition member with a projection of a low spring and then, with a projection of a high spring. It is therefore possible to non-linearly change the spring of the opening and closing means when contacting the partition member.

According to claim 4, since the seating section is formed by part of the diaphragm, it is possible to easily provide the seating section of each construction stated above.

According to claim 5, since in addition to the pushing member, there is also provided the depression on the side of seating section contacting the pushing member, it is possible to relieve the impact when the pushing member contacts the seating section to control the generation of the abnormal sound.

According to claim 6, since there is provided the depression on the surface of the pushing member contacting the seating section, it is possible to relieve the impact when the pushing member contacts the seating section to control the generation of the abnormal sound.

According to claim 7, since the elastic body section is provided with the lateral membrane section, when the internal pressure within the main fluid chamber increases, the lateral membrane section deforms to absorb the change of internal pressure. Accordingly, an influence of the change of internal pressure transmitted to the opening and closing means can be reduced to control the generation of abnormal sound.

According to claim 8, since the outer peripheral section of the partition member is supported in a floating manner by supporting the partition member through the elastic member, when the large vibration resulting from, for example, starting or stopping the engine is input, the partition member moves in response to the change of internal pressure in the main fluid chamber to absorb the change of internal pressure. It is therefore possible to decrease the generation of abnormal sound because the sudden change of internal pressure in the main fluid chamber can be controlled to prevent the generation of a cavitation phenomenon.

According to claim 9, since the return spring of the pushing member is supported in a floating manner, the force inputted from the return spring to the rigid plate forming the pushing member is decreased. As a result, even though there is generated the abnormal sound at the plate, it can be decreased. Further, input from the return spring to the plate in the case where the return spring resonates is also decreased.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
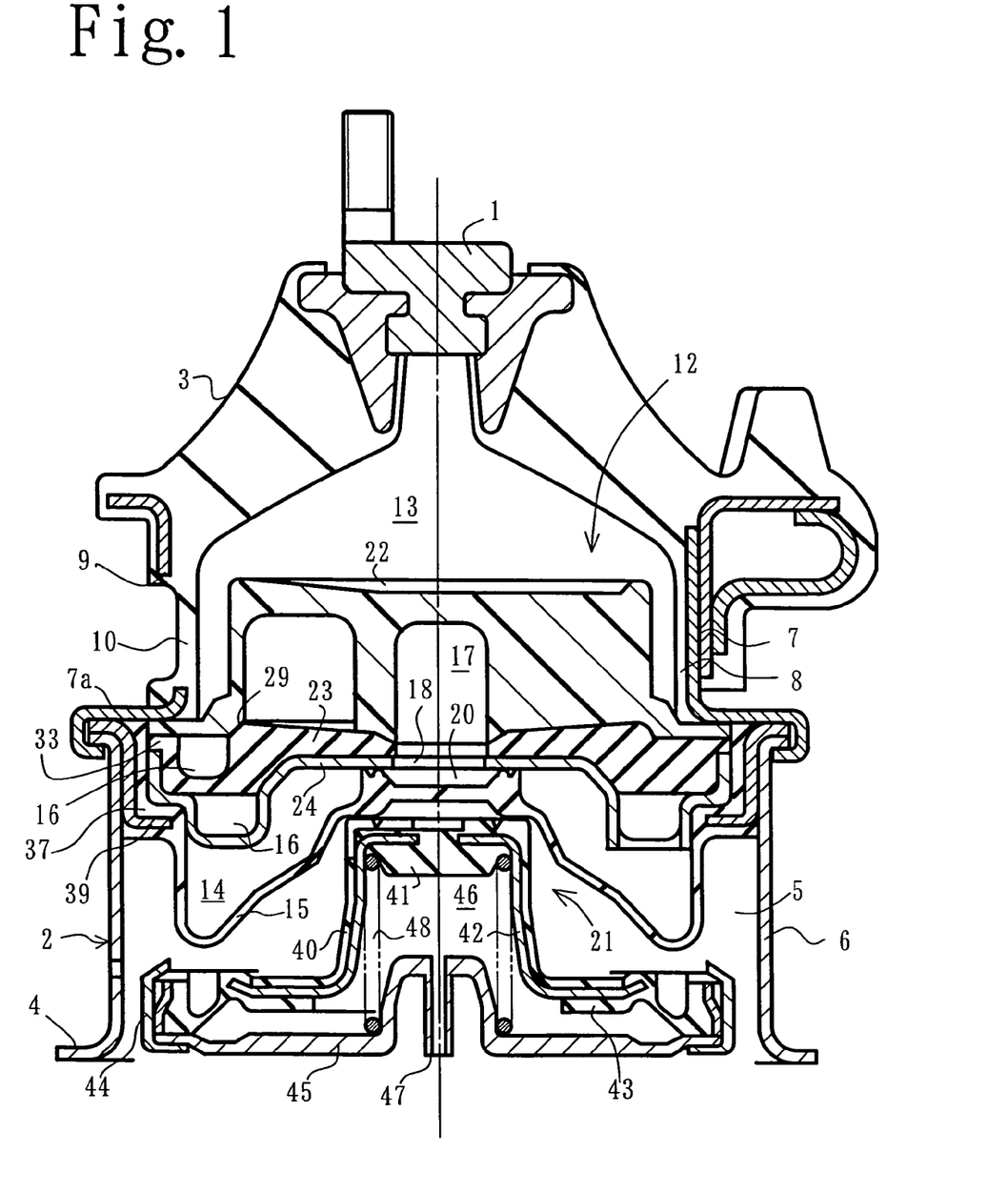
FIG. 1 is an entire cross sectional view showing an engine mount according to an embodiment of the present invention.
Figure 2:
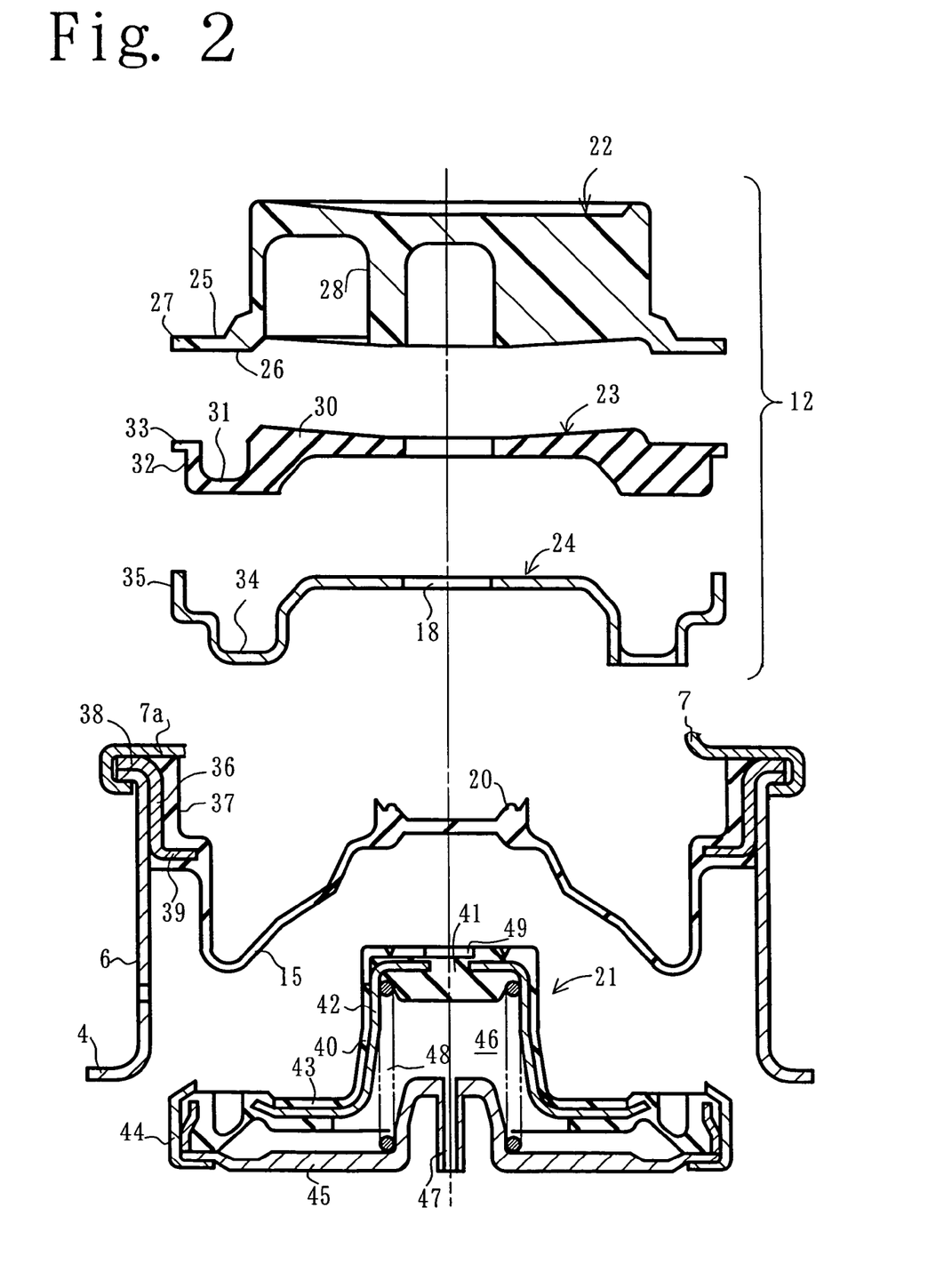
FIG. 2 is an exploded view showing essential parts of the engine mount.
Figure 3:
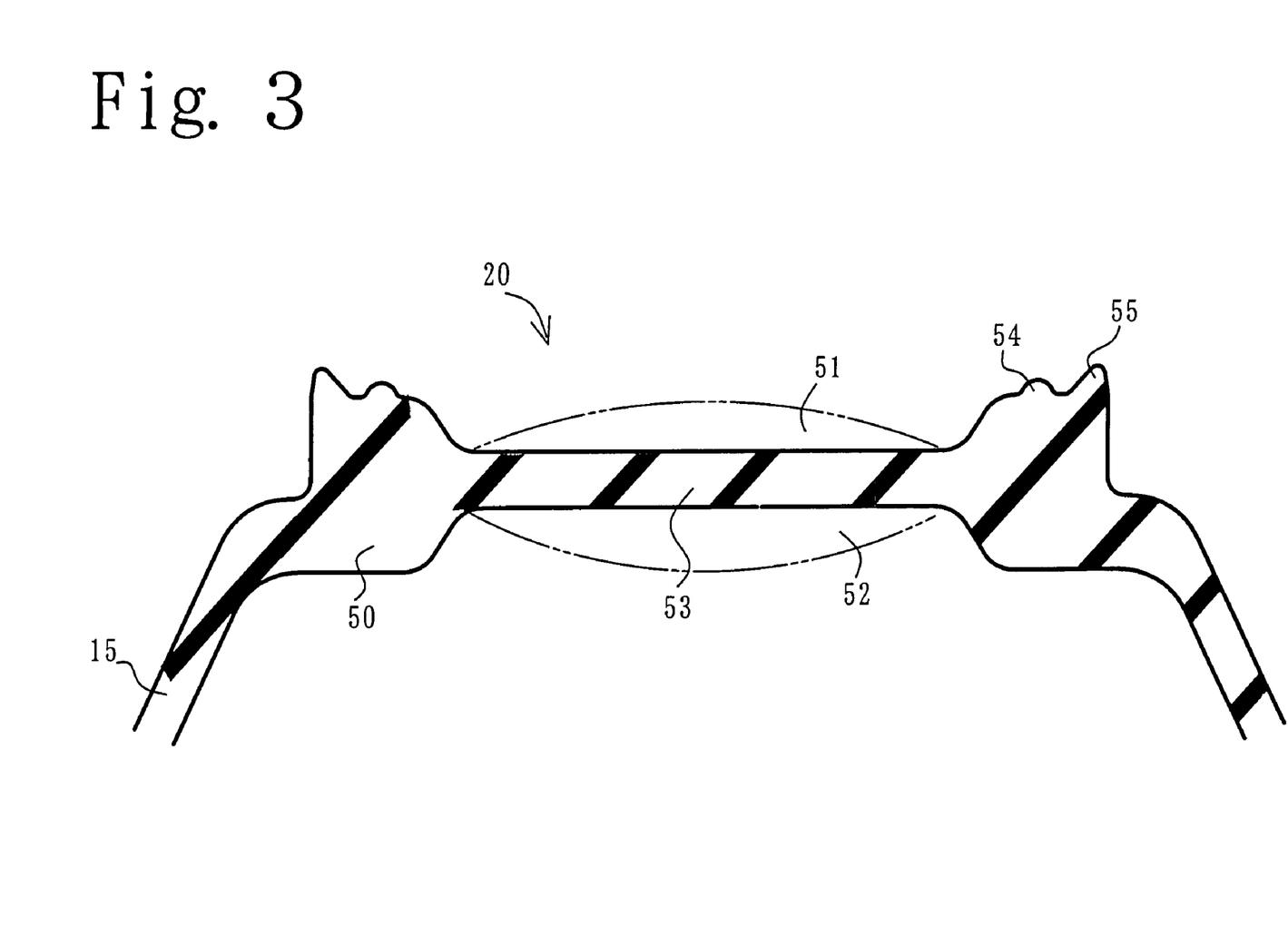
FIG. 3 is an enlarged cross sectional view of a seating section.
Figure 4:
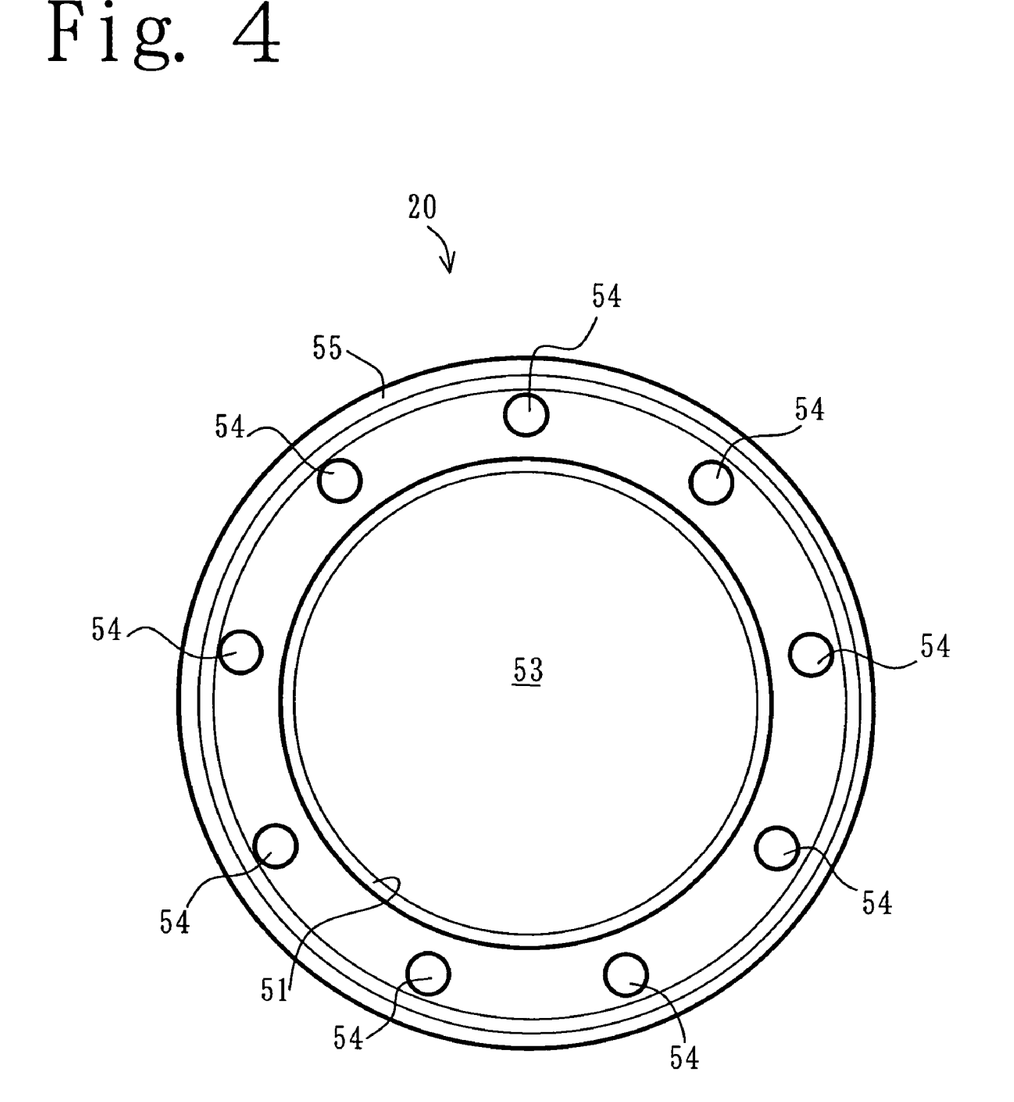
FIG. 4 is a plan view of the seating section.
Figure 5:
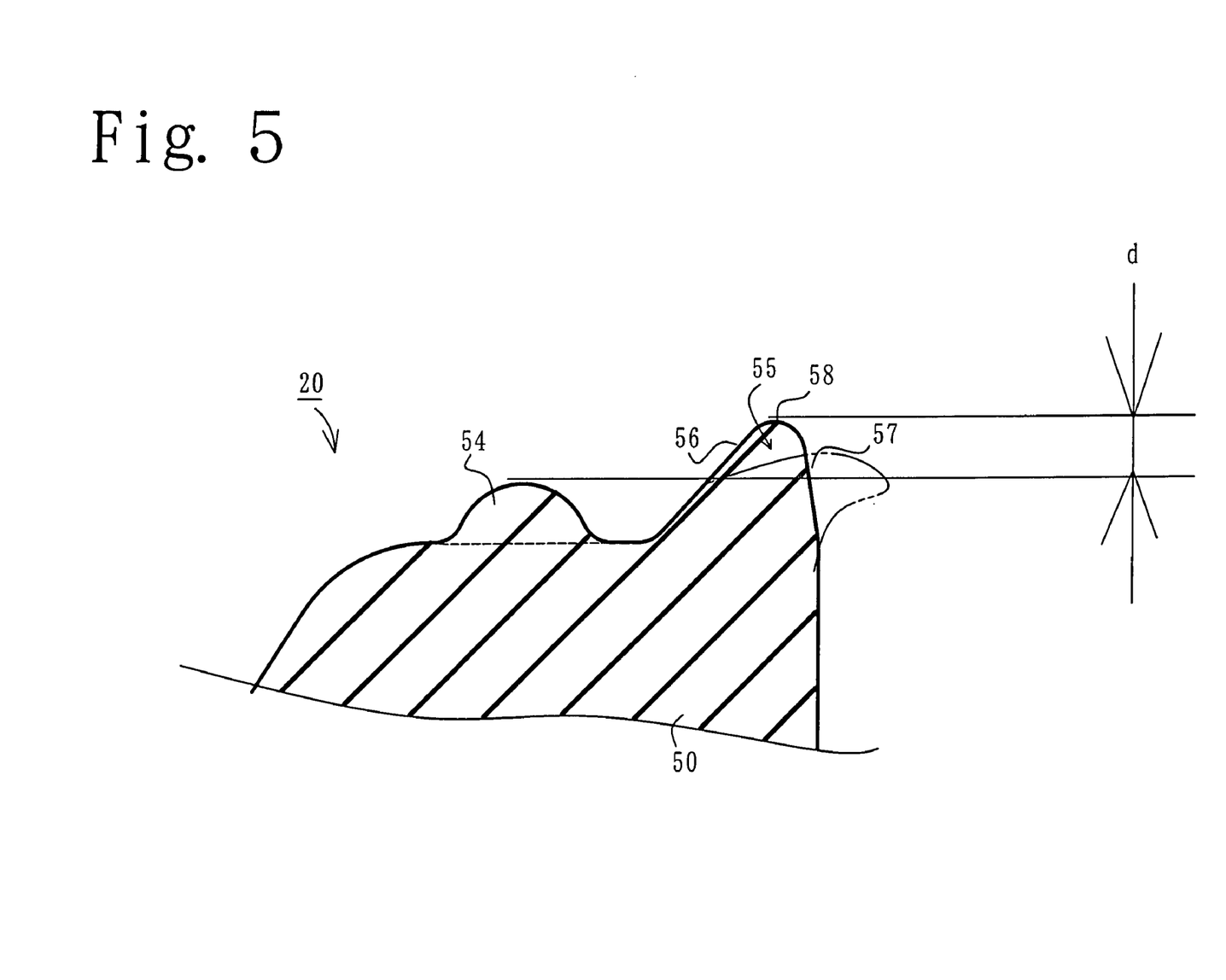
FIG. 5 is an enlarged cross sectional view of a seal section.
Figure 6:
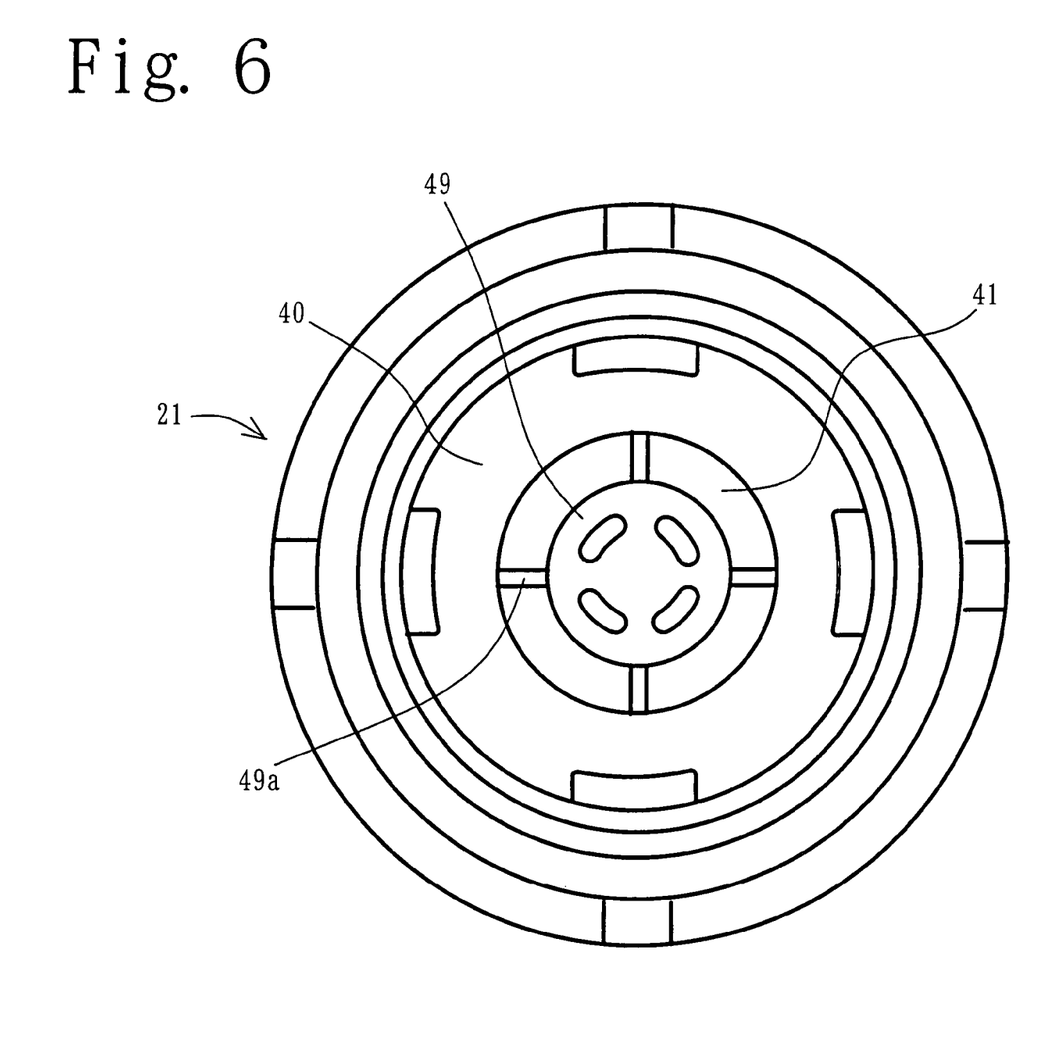
FIG. 6 is a plan view of a pushing member.
Figure 7:
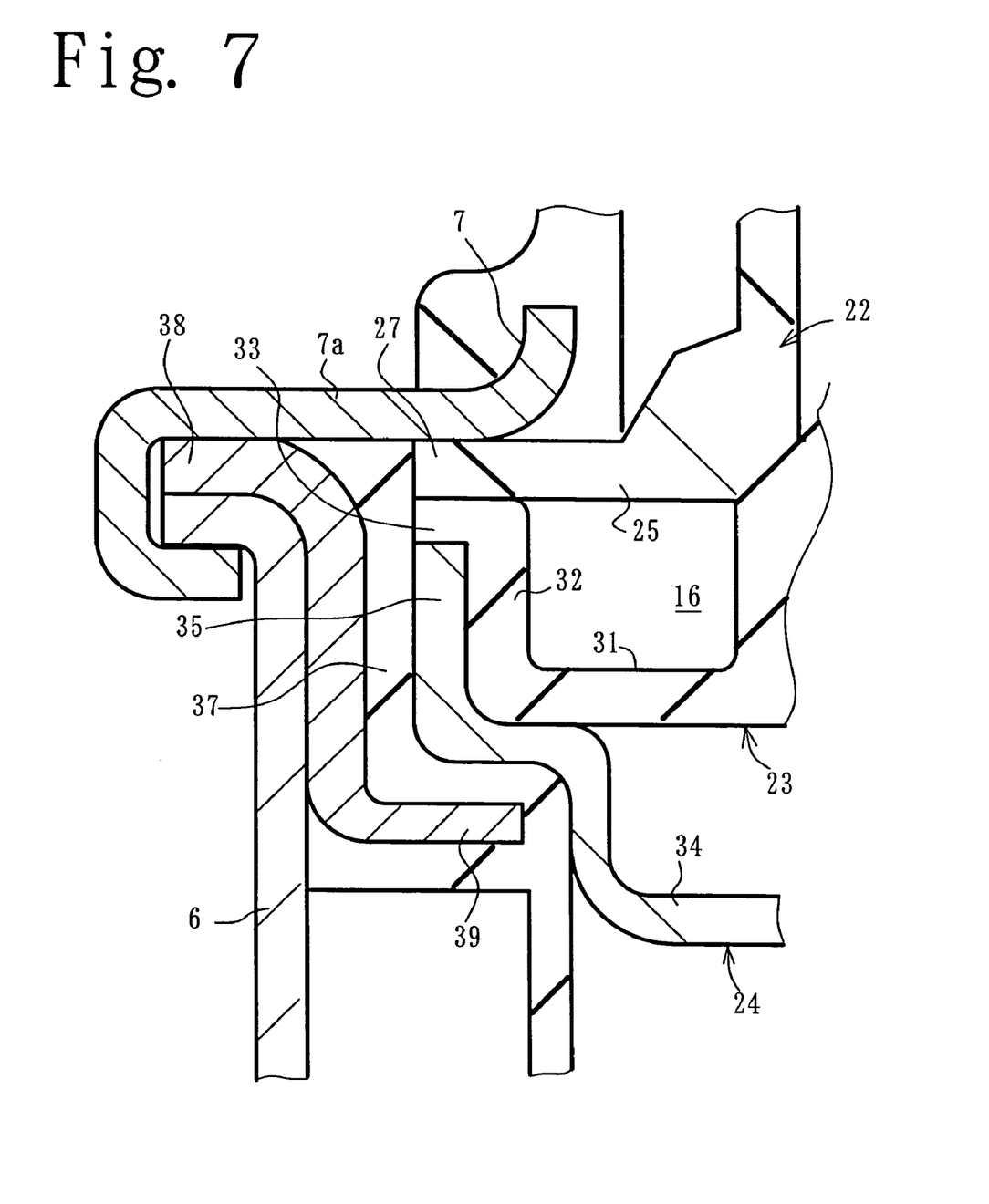
FIG. 7 is an enlarged cross sectional view showing a floating support structure of a partition member.
Figure 8:
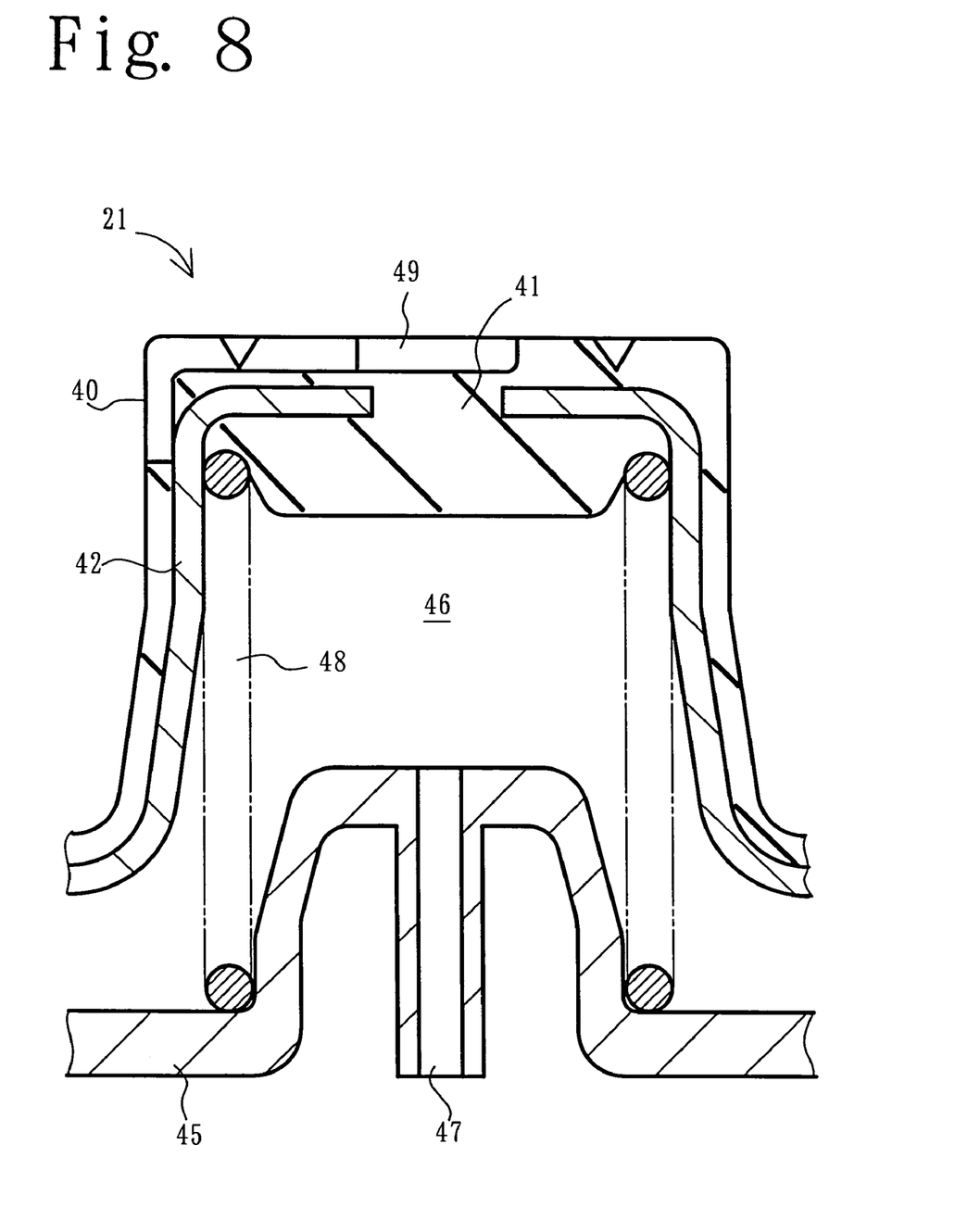
FIG. 8 is an enlarged cross sectional view showing a floating support structure of a return spring.

A preferred embodiment of the present invention will now be described with reference to the accompanying drawings. FIG. 1 is an entire cross sectional view of a fluid sealed engine mount according to the present embodiment. FIG. 2 is an exploded view of the components used herein. FIG. 3 is an enlarged cross sectional view of a seating section and FIG. 4 is a plan view thereof. FIG. 5 is an enlarged cross sectional view of a seal section and FIG. 6 is a plan view of a pushing member. FIG. 7 is an enlarged cross sectional view showing a structure of a fixing section of a partition member and FIG. 8 is an enlarged cross sectional view of the pushing member. A reference condition of a fluid sealed antivibration device is shown in FIG. 1 and a detailed description of the device will now be made based on this condition.

Referring first to FIGS. 1 and 2, this engine mount is provided with a first connecting member 1, a second connecting member 2, and an elastic body section 3. The first connecting member 1 is secured to an engine as a source of vibration by screws, while the second connecting member 2 is secured to a car body by a flange 4.

The flange 4 is connected to an operating chamber cylindrical section 6 made of metal enclosing an opening and closing means chamber 5 and the upper end of the flange 4 is connected to a main fluid chamber cylindrical section 7 by caulking. The main fluid chamber cylindrical section 7 is integrally formed with the bottom edge of the elastic body section 3 of which the internal surface is provided with a lining section 8 continuously and integrally formed with the elastic body section 3.

A side of the main fluid chamber cylindrical section 7 is partially provided with a circular hole 9 of which the lining section 8 forms a lateral membrane section 10 which can be elastically deformed outwardly through the hole 9. The lateral membrane section 10 is provided to absorb the change of internal pressure of a main fluid chamber 13 and the elastic deformation of the lateral membrane section 10 can be controlled by an operating means such as a solenoid, if necessary.

A fluid chamber is provided in the space enclosed by the first connecting member 1, the second connecting member 2, and the elastic body section 3. The inside of the fluid chamber is divided into the main fluid chamber 13 on the elastic body section 3 side and the sub-fluid chamber 14 on the opening and closing means chamber 5 side by a partition member 12. The sub-fluid chamber 14 is formed between a diaphragm 15 within the opening and closing means chamber 5 and the partition member 12.

Incompressible fluid is filled in the fluid chamber, and the main fluid chamber 13 is provided to communicate with a damping orifice 16 which always communicates with the sub-fluid chamber 14 and an idle orifice 17 which can be opened and closed. An opening 18 of the idle orifice 17 on the sub-fluid chamber 14 side is opened and closed by a thick seating section 20 formed on the central section of the diaphragm 15. The seating section 20 is pushed against the periphery of the opening 18 of the partition member 12 by an pushing member 21 for establishing contact therewith, thereby closing the opening 18. On the contrary, by lowering the pushing member 21, the seating section 20 is detached from the partition member 12 to open the opening 18.

As is apparent from FIG. 2, the partition member 12 is formed by the combination of a round table-shaped upper section 22 made of resin which greatly projects into the main fluid chamber 13, an intermediate section 23 made of an elastic member such as rubber, and a lower section 24 made of metal produced by aluminum die casting.

The outer periphery of the upper section 22 is provided with a flange 25 of which the part serves as a depression 26 forming the damping orifice passage 16 and of which the outermost peripheral section becomes a fixing section 27. The central section of the upper section 22 is provided with a downwardly opened substantially swirly passage 28 of which one end communicates with the opening 18 and the other end communicates with the inside of the main fluid chamber 13.

The intermediate section 23 is provided with a taper section 30 which is gradually thickened toward the outer peripheral side and a depressed groove 31 formed on the outer peripheral side of the taper section 30. The outermost peripheral section of the intermediate section 23 is provided with a vertical wall 32 forming the outer wall of the depressed groove 31. The depressed groove 31 is combined to face the depression 26 so that the upper step section of the damping orifice passage 16 can be formed therein. The upper end of the vertical wall 32 is a cushion flange 33 projecting outwardly in the radial direction.

This damping orifice passage 16 is helically formed between the upper section 22 and the intermediate section 23 and between the intermediate section 23 and the lower section 24. One end of the damping orifice passage 16 communicates with the inside of the main fluid chamber 13 while the other end communicates with the sub-fluid chamber 14. The characteristics of the damping orifice passage 16 are set to liquid-column resonate against a low-frequency vibration during single-geared running.

An inner section of the contact between the upper section 22 and the intermediate section 23 facing the damping orifice passage 16 forms a taper joint area 29 (see FIG. 1). Further, the fixing section 27 of the upper section 22 overlaps the cushion flange 33 of the vertical wall 32.

The lower section 24 is provided at its center with the opening 18. A depressed groove 34 is provided below the depressed groove 31 of the intermediate section 23, and a lower step section of the damping orifice passage 16 is formed between the depressed groove 34 and the intermediate section 23. An outermost peripheral section of the lower section 24 forms a vertical wall 35 to overlap the outside of the vertical wall 32 of the intermediate section 23, and the upper end of the vertical wall 35 is disposed to contact the lower surface of the cushion flange 33.

The diaphragm 15 made of a suitable flexible material such as rubber is integrally formed with an attaching ring 36 of which the outer periphery has a substantially crank-shaped cross section and forms an elastic peripheral wall 37 extending upwardly along the inner surface of the attaching ring 36. The elastic peripheral wall 37 extends upwardly along the outside of the vertical wall 35 and causes an outer peripheral end of the fixing section 27 to contact thereto. The upper end 38 of the attaching ring 36 is sandwiched between the operating chamber cylindrical section 6 and the main fluid chamber cylindrical section 7 and integrally fixed together by caulking.

In this manner, the partition member 12 is fixedly secured between a caulking flange 7a (see FIG. 2) of the main fluid chamber cylindrical section 7 and an inwardly projecting flange 39 (see FIG. 2) formed on the lower end of the attaching ring 36 and supported in a floating manner by the cushion flange 33 and the elastic peripheral wall 37.

The pushing member 21 has the center projecting upwardly in a columnar manner and the periphery of the pushing member 21 is formed to expand in the lateral direction. The pushing member 21 is entirely covered by a flexible membrane 40 which is non-permeable and integrally formed at its central section with a thick pushing section 41 made of an elastic body such as rubber. A metal plate 42 of which on end is integrally formed with the pushing section 41 is provided along the inside of the flexible membrane 40. The other end of the metal plate 42 on the outer peripheral section is integrally formed with a thick end section 43 which is the outer peripheral section of the flexible membrane 40.

The periphery of the thick end section 43 of the flexible membrane 40 is integrally caulked by a fixing ring 44 at an outer peripheral section of a bottom plate 45 made of resin and at its entire periphery. In this manner, closed space is provided between the flexible membrane 40 and the bottom plate 45 to form a negative pressure chamber 46, and a joint pipe 47 is provided at the central section of the bottom plate 45 to communicate with the negative pressure chamber 46 and an air intake passage of an engine (not shown).

A coil spring 48 is provided between the periphery of the joint pipe 47 and the pushing section 41. When the negative pressure chamber 46 is opened to the atmosphere, the coil spring 48 pushes the pushing section 41 up to cause the seating section 20 to push against the periphery of the opening 18 of the lower section 24 for contact. On the contrary, when the negative pressure chamber 46 is connected to a negative pressure source, the pushing section 41 is pushed down against the coil spring 48 to allow the seating section 20 to open the opening 18. Reference numeral 49 is a depression formed on the surface of the pushing member 21 contacting the seating section 20.

FIG. 6 is a plan view showing the pushing member 21 from the top of FIG. 2. As is obvious from this figure, the center of the upper surface of the pushing member 21 contacting the seating section 20 is provided with the round depression 49 which reaches the outer peripheral section to communicate with a cruciate groove 49a.

As shown in FIGS. 3 through 5, the seating section 20 is provided with a ring-shaped section 50 which is thicker than the remaining sections. The central section of the seating section 20 is provided at its two sides with depressions 51 and 52 whereby a thin section 53 is formed therein.

The ring-shaped section 50 is concentrically provided at its inner peripheral side with substantially hemispheric protrusions 54 at regular intervals and at its outer peripheral side with a seal 55 of a substantially right triangle cross section. The projection height of the protrusions 54 is lowered by d than the seal 55 (see FIG. 5).

The seal 55 is provided in such a manner that the inner side forms an oblique side 56 and the outer side forms a vertical side 57, wherein the apex 58 is situated substantially on or near the extension of the vertical side 57.

Operation of the present embodiment will now be described. When large vibration is caused at the time of starting or stopping an engine, it is transmitted to an engine mount, wherein an elastic body section 3 greatly deforms to generate the change of internal pressure in a main fluid chamber 13. In this case, when the elastic body section deforms downwardly, a seating section 20 and a pushing member 21 are pushed down by large fluid pressure applied to an opening 18 from within an idle orifice passage 17 and departs from the periphery of the opening 18 of the lower section 24. On the contrary, when the elastic body section 3 deforms upwardly, the main fluid chamber 13 is kept under negative pressure, wherein the seating section 20 is attracted near the opening 18 of the lower section 24 for contact.

In this case, since the seating section 20 is formed thick and the central section thereof is formed to have the thin section 53, the thin section 53 absorbs the change of internal pressure in the main fluid chamber 13. Accordingly, even though large vibration is input, sudden change of internal pressure within the main fluid chamber 13 can be controlled to prevent or control the generation of a cavitation phenomenon. As a result, it is possible to make it difficult to generate an abnormal sound by the seating section 20.

Further, since the seal 55 is designed to have a substantially right triangle cross section and the outside thereof has a substantially vertical side 57, when the seating section 20 contacts the partition member side, as shown by an imaginary line in FIG. 5, the apex of the seal 55 first tilts toward the vertical side 57 to enhance the sealing effect and relieve an impact, thereby preventing or controlling the generation of an abnormal sound.

Still further, since there are provided substantially hemispheric protrusions 54 of which the projecting height is lower than that of the seal 55, a contacting condition can be changed so that the seal 55 can contact the partition member 12 with a projection of a low spring constant and then, with a projection 54 of a high spring constant. In this manner, it is possible to non-linearly change the spring of the opening and closing means when contacting with the partition member 12.

Since the seating section 20 is formed by part of the diaphragm 15, it is possible to easily provide the seating section 20.

Since in addition to the pushing member 21, the depression 52 is provided on the side of the seating section 20 contacting the pushing member 21, an impact when the pushing member 21 contacts the seating section 20 can be relieved to prevent or control the generation of an abnormal sound.

In addition, since there is provided the round depression 49 on the surface of the pushing member 21 contacting the seating section 20, the pushing member 21 is kept under a low spring constant to relieve the impact when the pushing member 21 contacts the seating section 20, thereby preventing or controlling the generation of the abnormal sound.

As shown in FIG. 7, the partition member 12 is sandwiched between the operation chamber cylindrical section 6 and the main fluid chamber cylindrical section 7 through the cushion flange 33 and the elastic peripheral wall 37 so that it can be supported in a floating manner. Namely, the flange 25 which is the outer peripheral section of the upper section 22 can be moved downwardly in the figure by the cushion flange 33 and the elastic peripheral wall 37. On the other hand, the lower section 24 can be vertically moved in the figure because the vertical wall 35 on the outer peripheral side contacts the cushion flange 33 and the elastic peripheral wall 37 along its length.

Accordingly, when the plus (+) vibration is applied into the main fluid chamber 13, the cushion flange 33 and the elastic peripheral wall 37 are compressed to cause the entire partition member 12 to move downwardly in the figure, thereby preventing the sudden change of internal pressure in the main fluid chamber 13. On the contrary, when the minus (−) vibration is applied into the main fluid chamber 13, the lower section 24 of the partition member 12 compresses the cushion flange 33 to move it upwardly in the figure, thereby preventing the sudden change of internal pressure in the main fluid chamber 13. However, since the upper section 22 of the partition member 12 is directly secured by the caulking flange 7a, the upward movement of the upper section 22 is controlled.

As shown in FIG. 8, the upper end of the coil spring 48 contacts the pushing section 41. The pushing section 41 is made of elastic member and the coil spring 48 is supported in a floating manner by the pushing section 41. Accordingly, when the force or vibration of the pushing member 21 is applied, it is transmitted to the metal plate 42 through the pushing section 41 from the coil spring 48. However, since the coil spring is supported in a floating manner by the pushing section 41, transmission of the force or vibration to the metal plate 42 can be remarkably reduced.

On the other hand, the metal plate 42 is a rigid member of a substantially trumpet shape. Once the vibration is transmitted to the metal plate 42, it serves as a kind of loudspeaker. Accordingly, by supporting the coil spring 48 in a floating manner, transmission of the vibration to the metal plate 42 can be reduced and as a result, abnormal sound generated from the metal plate 42 can also be reduced. Further, when comparatively strong vertical movement is made in response to the opening and closing of the pushing member 21 and the seating section 20, the coil spring 48 is also caused to resonate. However, the transmission of vibration to the metal plate 42 at the time of resonance can also be reduced and as a result, generation of abnormal sound can be reduced.

What is claimed is:

1. A fluid sealed antivibration device comprising:
   a first connecting member secured to a vibration source side;
   a second connecting member secured to a car body side; and
   an elastic body section of a substantially conical shape disposed therebetween;
   wherein a fluid chamber is formed using the elastic body section and a partition member and divided into a main fluid chamber and a sub-fluid chamber by the partition member which is provided with an orifice passage for communicating with both the main fluid chamber and the sub-fluid chamber, and an opening and closing means is provided for opening and closing the orifice passage;
   wherein the opening and closing means for the orifice passage includes a seating section provided on a diaphragm forming the sub-fluid chamber, the seating section having a flat, disc-shaped central portion and ring-shaped section surrounding and extending below the disc-shaped central portion, the opening and closing means also including a pushing member for pushing the ring-shaped section of the seating section by a return spring, a space remaining between the pushing member and the disc-shaped central portion of the seating section, and the partition member including an upper section, an intermediate section, and a lower section stacked one above the other, each of the stacked sections having centers and outer circumferential edges aligned one above the other.

2. The fluid sealed antivibration device according to claim 1, wherein the elastic body section is detachably provided with a thin, elastically deformable lateral membrane section which is adapted to absorb a change of internal pressure in the main fluid chamber.

3. The fluid sealed antivibration device according to claim 1, wherein an axis of the return spring is vertical and a pushing direction of the pushing member is vertical.

4. A fluid sealed antivibration device comprising:
a first connecting member secured to a vibration source side;
a second connecting member secured to a car body side; and
an elastic body section of a substantially conical shape disposed therebetween:
a partition member having an upper section, an intermediate section, and a lower section stacked one above the other,
a fluid chamber formed using the elastic body section and the partition member, the fluid chamber being divided into a main fluid chamber and a sub-fluid chamber by the partition member; and
an orifice passage having at least a portion of which is formed along a central axis of the upper section, the intermediate section, and the lower section of the partition member for communication with both the main fluid chamber and the sub-fluid chamber,
wherein an opening and closing means is provided with a seating section for opening and closing the orifice passage, and
the seating section including a thin section formed in a central portion of the seating section and an upward projecting circular seal provided on a periphery of the seating section so as to surround a thin section, the circular seal pressing against the lower section of the partition member thereby closing an opening in the lower section of the partition member,
wherein the stacked sections of the partition member have centers and outer circumferential edges aligned one above the other.

* * * * *